United States Patent [19]

Corbic

[11] 4,059,377

[45] Nov. 22, 1977

[54] APPARATUS FOR THE PRODUCTION AND DEPOSITION OF BANDS

[75] Inventor: Yves Jean Corbic, Chatou, France

[73] Assignee: Societe a Responsabilite Limitee dite: TECCA, France

[21] Appl. No.: 764,713

[22] Filed: Feb. 2, 1977

[30] Foreign Application Priority Data

Feb. 4, 1976 France .................................. 76.03100

[51] Int. Cl.$^2$ .............................................. B29C 17/00
[52] U.S. Cl. .................................. 425/305.1; 425/443; 264/160
[58] Field of Search ............... 425/292, 305 R, 324 R, 425/443; 264/160

[56] References Cited

U.S. PATENT DOCUMENTS

| 3,605,192 | 9/1971 | Edwards | 425/292 |
| 3,709,643 | 1/1973 | Nasica | 425/308 |

*Primary Examiner*—Robert L. Spicer, Jr.
*Attorney, Agent, or Firm*—James E. Nilles

[57] ABSTRACT

An apparatus for the production and deposition of bands in which a pre-winding cavity is positioned below the mould having a base plate integral with the ejecting plunger via a supporting member. The base plate, plunger and supporting member are fixed in space and the mould and cavity are vertically movable relative to the latter. The movable cutting member is connected to a control member which is independent of the vertical movements of the mould. It is possible to impart a reverse movement to the transporting rollers in order to disengage the strip from the access slot.

11 Claims, 4 Drawing Figures

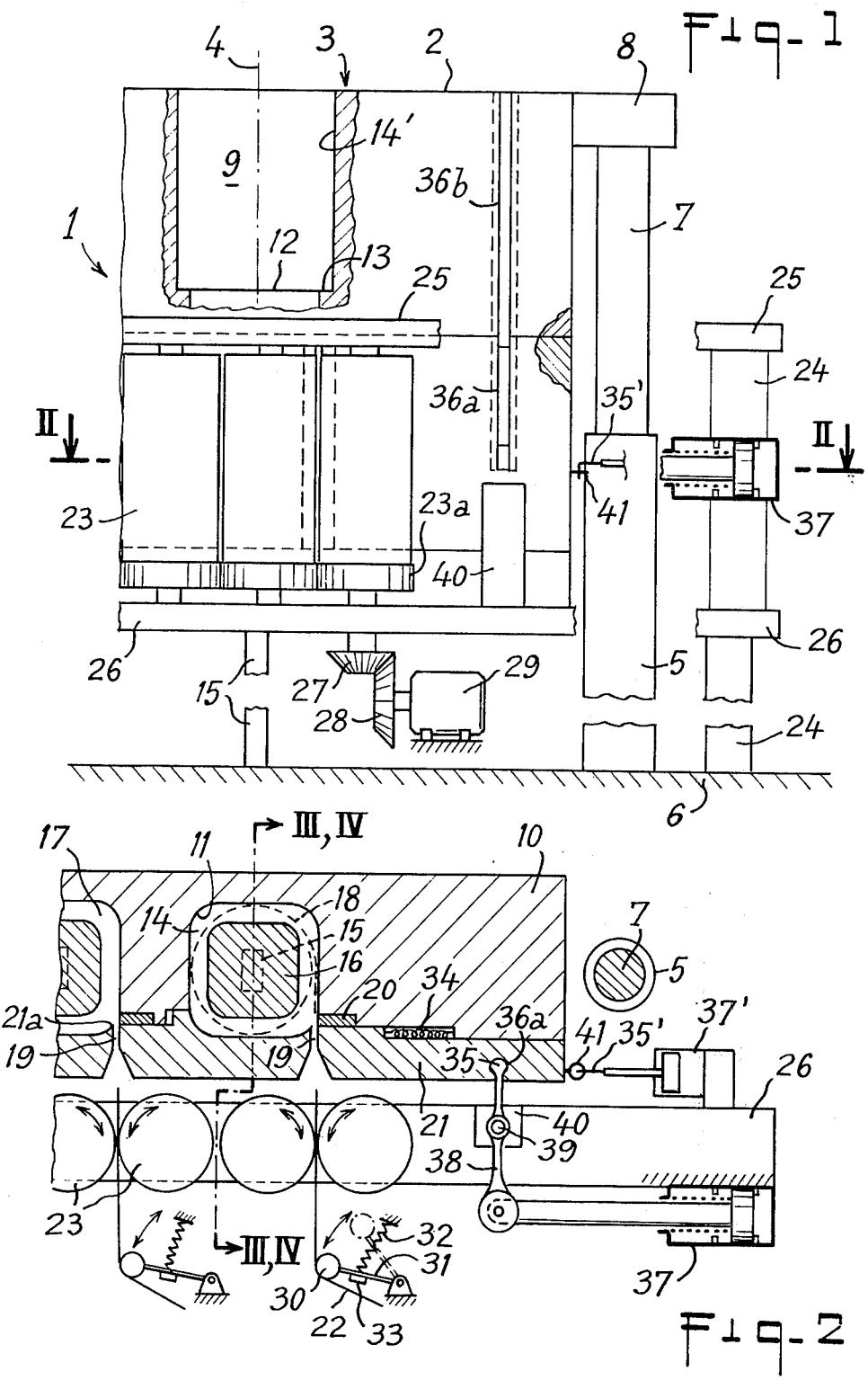

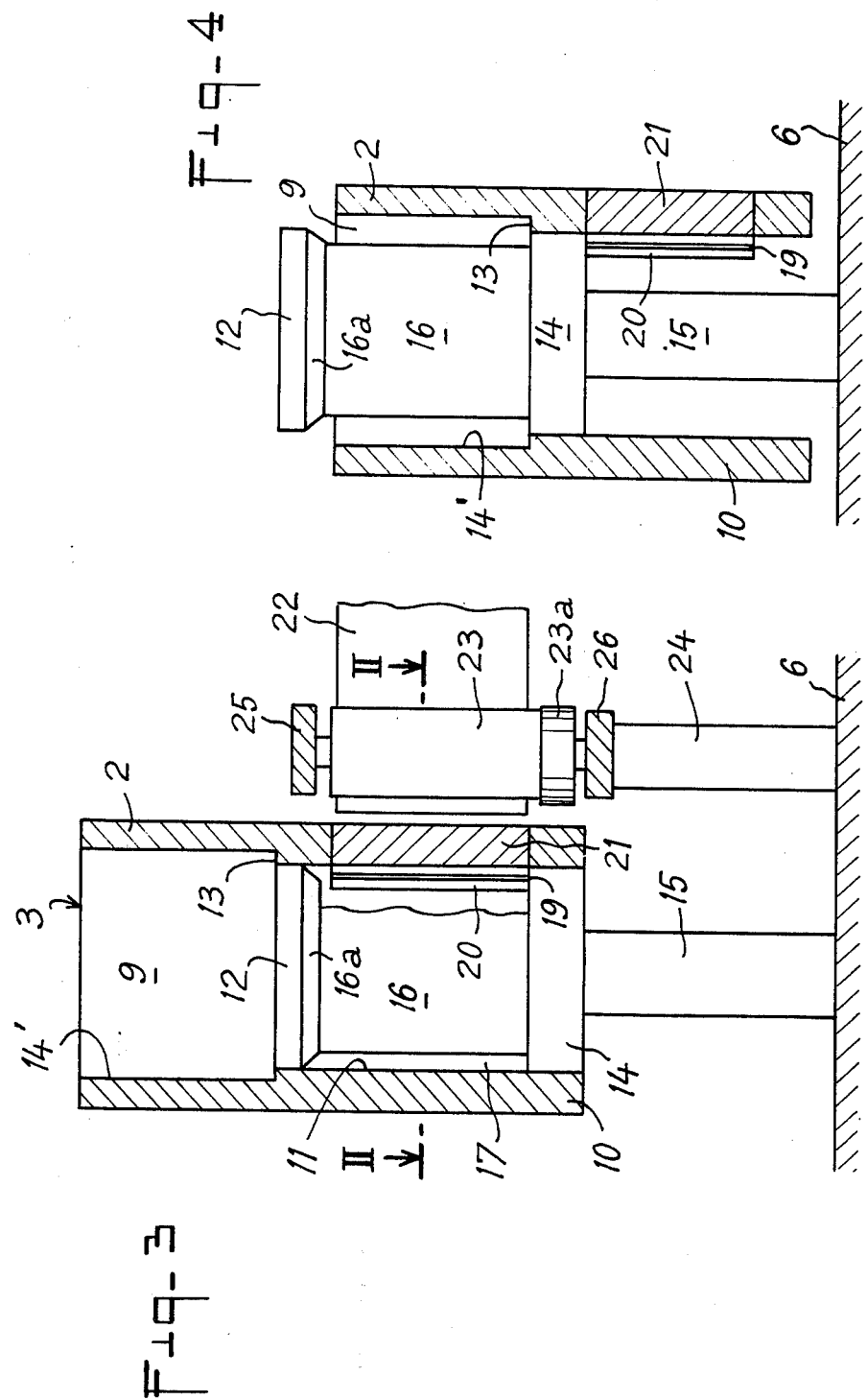

APPARATUS FOR THE PRODUCTION AND DEPOSITION OF BANDS

BACKGROUND OF THE INVENTION

The present invention relates to an apparatus for the production and deposition of bands associated with the shaping mould of a shaping station of an installation for the thermal shaping of containers provided with bands, said apparatus being of the type comprising in an elongated body at least one preferably cylindrical and so-called pre-winding cavity, at least one fixed cutting member and one movable cutting member arranged in the vicinity of said cavity, preferably in such a way that the two cutting members define by one of their sides a portion of the said cavity, at least one access slot, preferably made in the movable cutting member parallel to the axis of said cavity and perpendicular to the displacement direction of said movable cutting member which issues preferably tangentially into the said cavity in the area of the fixed cutting member and which connects the latter laterally towards the outside, at least one ejecting plunger mounted without significant lateral clearance in the said cavity in such a way that it can occupy in the latter two extreme positions whereof one, the retracted position, permits the charging of the cavity with a band and whereof the other, the discharge position, corresponds to the discharge of the band via the front opening of the said cavity, actuating means for the movable cutting member, at least a pair of transporting rollers located upstream of the access slot and preferably in the immediate vicinity of the latter in such a way that the tangential plane common to the two rollers of the said pair of rollers passes via the said access slot, a strip whose width is at the most equal to the height of the slot whereof the free end is gripped between the said two transporting rollers and from which are cut the said bands, as well as a driving means able to sequentially drive the two transporting rollers for the purpose of introducing into the said cavity a portion of the strip whose length is equal to that of one band.

An apparatus for the production and deposition of bands is for example known from French Patent application Nos. 70.09142 (2,034,915). An identical apparatus is known from German Utility Model 1,969,306. The known apparatuses have the disadvantage that the shaping mould must be brought into a position of alignment with the pre-winding cavity, either by a swinging movement or by a lateral translational movement before it is possible to deposit a band in the mould.

BRIEF SUMMARY OF THE INVENTION

The problem of the present invention is to obviate these disadvantages and relates to an apparatus of the type described hereinbefore which permits the introduction of a band into the mould without prior alignment and is of a simple and effective design.

According to the invention, this problem is solved in that each pre-winding cavity of the band production and deposition apparatus is arranged below a mould and the body containing the different cavities is integral with the block of moulds, each ejecting plunger is fixed in space on a frame, each mould comprises a movable base plate which is aligned with the corresponding cavity and is integral with the ejecting plunger by means of an intermediate supporting member and has a cross-section which is less than that of the shaping chamber of the mould in such a way that a marginal base portion preferably having the shape of an annular shoulder is located between the side walls and the movable base plate of the mould, whereby the base plate, intermediate supporting member and ejecting plunger are positioned relative to one another and relative to the shaping chamber and pre-winding cavity in such a way that the upper face of the movable base plate is located in the same plane as the marginal base portion and the intermediate member is located entirely within the said cavity when the ejecting plunger is positioned at the lower end of said cavity, the intermediate supporting member has a cross-section which is less than that of the ejecting plunger, each pair of transporting rollers is fixed in space, preferably on the same frame as the corresponding ejecting plunger and extends parallel to the supporting member substantially over the entire height of the latter starting from the ejecting plunger, the actuating means for the movable cutting member comprise a control member able to act on the movable cutting member parallel to the cutting stroke direction thereof and which is independent of the movements of said movable cutting member, said movements being parallel to the axes of the mould and of the cavity, and the driving means for each pair of transporting members comprises a reverse travel control which can be operated at the end of the cutting stroke of the movable cutting member and which automatically stops the reverse travel of the transporting rollers as soon as the latter have moved back the end of the strip engaged in the slot to an area located outside the displacement path of the block of moulds.

As a result of this design, an apparatus for the production and deposition of bands is obtained which only has a very limited number of components and parts which are movable either in translation, or by pivoting, or by rotation. The transfer of the band located in the pre-winding cavity to the shaping chamber of the mould takes place automatically during the downward movement of the mould for removing the thermally shaped container from the mould, whereby at the end of this downward movement, the marginal portion of the bottom of the mould is aligned with or positioned below the plane of the upper face of the ejecting plunger in such a way that at this time the band expands radially under the action of its own elasticity and is held by the marginal portion of the bottom during the following upward movement of the said mould, whereby at the end of this upward movement the marginal portion of the bottom of the mould is again aligned with the upper face of the base plate and a new cycle for the thermal shaping of a container can then commence. During the thermal shaping of a container, the pre-winding cavity is located level with the transporting rollers in such a way that a portion of the strip, whose length corresponds to that of one band can be introduced into the said cavity under the rotation action of the two transporting rollers which stop as soon as the given strip length has been introduced into the cavity. At this time, the movable cutting member is operated and cuts the portion of the strip located in the cavity from the remainder of the strip whose free end is withdrawn from the remainder of the strip whose free end is withdrawn from the access slot and is moved away from the path of the mould by a brief reverse rotation (reverse travel) of the transporting rollers which are obviously located outside the path of the mould but are nevertheless positioned in the immediate vicinity thereof. Thus, the free end of the strip is not deformed or damaged by the descending mould and can be introduced into the access slot and into the cavity as soon as the mould has reassumed its raised position.

The intermediate supporting member has a cylindrical and preferably smooth periphery, whose cross-section has a surface area at least equal to half the surface area of the cross-section of the cavity and defines with the inner wall of said cavity an annular guidance chamber for the band introduced into the cavity.

The control member for the operating means for the movable cutting member is advantageously constituted by a lug and the movable cutting member and the wall of the mould located above said movable member comprise two groove portions aligned parallel to the displacement direction of the mould when the movable cutting member is in the stationary position and in one of which is permanently engaged in a sliding manner the said control lug.

The control member is connected to a control jack, preferably via a two-armed lever.

The control member can also comprise a hook integral with a control jack and which can engage in a recess, such as an eyelet provided on the movable cutting member, when the mould occupies its raised shaping position.

Upstream and preferably in the immediate vicinity of the pair of transporting rollers it is advantageous to provide a tightening roller for the strip gripped between the said transporting rollers, whereby the tightening roller is mounted on a pivoting arm pulled by a spring in such a way that the said tightening roller moves away from the transporting rollers.

The reverse movement control of the driving means for the transporting rollers is advantageously associated with a stop switch for the reverse movement of the transporting rollers, said switch being preferably operated by the pivoting arm.

BRIEF DESCRIPTION OF THE DRAWINGS

Other and further objects of the present invention will be apparent from the following description and claims and are illustrated in the accompanying drawings, which by way of illustration show preferred embodiments of the present invention and the principles thereof and what are now considered to be the best modes contemplated for applying these principles. Other embodiments of the invention embodying the same or equivalent principles may be used and structural changes may be made as desired by those skilled in the art, without departing from the invention and the scope of the appended claims. In the drawings show:

FIG. 1 a front elevation of the apparatus for the production and deposition of bands associated with the moulds of a moulding station, whereby said drawing also shows certain parly torn away details.

FIG. 2 a plan view of a cross-section along the line II—II of FIGS. 1 and 3.

FIG. 3 a side view of a vertical section along the broken line III—III of FIG. 2.

FIG. 4 a view identical to that of FIG. 3 showing a vertical section along the broken line IV-IV of Fig. 2, but with the moulds and pre-winding cavities in the lowered position.

DETAILED DESCRIPTION OF THE PREFERRED EMBODIMENTS

The apparatus for the production and deposition of bands 1 is associated with the moulds of a shaping station of an installation for the thermal shaping of a container. The basic technical concept of installations for the thermal shaping of a container from a thermoplastic strip is widely known, making in unnecessary to provide a detailed description here. However, it is pointed out that a thermal shaping installation of this type is described for example in French Patent 70.00928 (2,028,765). In the shaping station of such a thermal shaping installation is generally provided a block of moulds 2 which comprises a group of moulds 3 whose axes 4 determine a vertical plane perpendicular to the displacement direction of the not shown strip of thermoplastic material and the containers which are formed from this strip. The moulds 3 with their block of moulds 2 are vertically movable between two end positions, namely a raised position (FIG. 3) corresponding to the position of shaping a container and a lowered position (FIG. 4) which corresponds to the removal from the mould of the thermally shaped containers and which permits the discharge of the containers in the conveying direction of the thermoplastic strip which is perpendicular to the vertical plane determined by the axes 4 of the moulds 3. The upward and downward movements of moulds 3 are ensured by at least two lifting jacks 5 whose lower end is fixed to a frame 6 and whose movable rod 7 is integral by its upper end with a supporting plate 8 forming part of the side of the block of moulds 2. In the attached drawings, only one end of the block of moulds 2 is shown, but it is obvious that the other end of said block of moulds is also associated with a lifting jack 7. Moulds 3 in block of moulds 2 are in the form of shaping chmabers 9 which are open at the top and have a cross-section which is generally inscribed in a square or rectangle and which has angles which are rounded to a greater or lesser extent.

The block of moulds 2 is extended downwards by a transversely elongated body 10 which comprises for each mould 3 a so-called pre-winding cavity 11 aligned with the shaping chamber 9 and having a cross-section which is smaller than that of the shaping chamber 9. The pre-winding cavity 11 issues via its upper end into the shaping chamber 9 whose base is defined largely by a base plate 12 which is fixed in space and which, due to the vertical mobility of the block of moulds 2, is movable relative to the marginal portion of base 13 and the side walls 14' of mould 3. Preferably the cross-section of shaping chamber 9 is only slightly larger than the cross-section of pre-winding cavity 11 and that of the movable base plate 12, so that the marginal base portion 13, which preferably has the shape of an annular shoulder only has a very limited width. With the mould 3 in the raised position (cf FIGS. 1 and 3) the upper face of movable base plate 12 and marginal base portion 13 are located in the same horizontal plane.

The apparatus for the production and deposition of bands 1 also comprises for each pre-winding cavity 11 an ejecting plunger 14 which is fixed in space on frame 6 by means of a rod or a supporting post 15. With the mould 3 in the raised position, the ejecting plunger 15 is located at the lower end of the pre-winding cavity 11 and the movable base plate 12 of mould 3 is aligned with the marginal base portion 13 of said mould 3 (cf FIG. 3). Ejecting plunger 14 is located in pre-winding cavity 11 without substantially any lateral clearance relative to the said cylindrical cavity 11 and slides along the inner wall of said cavity at least up to the level of the marginal base portion 13 of moulds 3 when the latter occupies its lowered position (cf FIG. 4). Movable base plate 12 and ejecting plunger 14 are rendered integral with one another by means of an intermediate supporting member 16 having a cross-section smaller than that of ejecting plunger 14 and of pre-winding chamber 11. In principle, all the cross-sections of the shaping chamber 9, movable base plate 12, pre-winding chamber 11 and ejecting plunger 14 are inscribed in rectangles and preferably in squares and have rounded wall portions, at least in the angles of said rectangles. Obviously, the other wall portions can also be curved in such a way that the cross-section of said members can also be circular or oval.

As can be seen more particularly in FIGS. 3 and 4, the intermediate supporting member 16 has at its upper end a pyramid or frustum-shaped portion 16a, whose small base is connected to the remainder of the supporting member 16 and whose large base is connected to the movable base plate 12. The intermediate supporting member 16 defines, by its periphery, with the free annular portion of ejecting plunger 14 and the inner wall of pre-winding cavity 11 an annular guidance chamber 17 for a strip of band portion 18 (cf FIG. 2) which is laterally introduced into the pre-winding cavity 11.

The pre-winding cavity 11 is laterally accessible to an access slot 19 extending substantially over the entire useful height of pre-winding cavity 11, said useful height occurring between the ejecting plunger 14 and the movable base plate 12 with mould 3 in the raised position.

The apparatus for the production and deposition of bands 1 also comprises, for each pre-winding cavity 11, a fixed cutting member 20 and a movable cutting member 21, whereof one side constitutes a portion of the inner lateral wall of the pre-winding cavity 11. According to the embodiment shown in the attached drawing, access slot 19 is provided in movable cutting member 21 and it is the edge defined by the intersection between the lateral wall of access slot 19 and the side of the movable cutting member which forms a portion of the inner wall of the pre-winding cavity 11 which constitutes the cutting edge of said movable cutting member 21. Obviously, this cutting edge, designated by the reference numeral 21a, cooperates with a corresponding cutting edge of the fixed cutting member 20 located in body 10 of cavities 11 at the opening of access slot 19 in the said pre-winding cavity 11. The various movable cutting members 21 for the different pre-winding cavities 11 are integral with one another and are guided in accordance with their cutting path perpendicular to the extension of access slots 19 along body 10 of pre-winding cavities 11. In order to facilitate the introduction of the free end of strip 22, from which are cut strip or band portions 18 in pre-winding cavity 11 access slots 19 are widened towards the outside and only have a very narrow rectangular cross-section in the immediate vicinity of pre-winding cavity 11.

In front of each access slot 19 is provided a pair of transporting rollers 23 which are fixed very close to the corresponding pre-winding cavity 11, but outside the vertical path of movement of block of moulds 2. Each pair of transporting rollers 23 is fixed in space on frame 6 via posts 24 and upper transverse supporting bars 25 and lower transverse supporting bars 26. Each pair of transporting rollers 23 extends parallel to the intermediate supporting members 16 substantially over the entire height of the latter from ejecting plunger 14. At the lower end thereof located level with ejecting plunger 14, each transporting roller 23 has a toothed wheel 23a which meshes with that of the adjacent transporting roller. One of the transporting rollers 23 is connected via a set of pinions 27, 28 to a sequentially driven motor 29. The transporting rollers of one pair of transporting rollers 23 are positioned in front of access slot 19 in such a way that, with the movable cutting member 21 in the inoperative position (cf FIG. 2), the plane tangential to the transporting rollers of one pair coincides at least approximately with the slot 19. Obviously, strip 22 is gripped between the two rollers 23 at the location of said common tangential plane between the two transporting rollers.

Motor 29, which is not necessarily an electric motor, is periodically operated in forward gear in such a way that a strip portion whose length is the same as that of one band 18 enters the pre-winding cavity and following the path defined on the one hand by cavity 11 and on the other by the intermediate supporting member 16 is at least partly wound onto itself. As soon as the predetermined length of a strip portion has been introduced into pre-winding cavity 11, the forward operation of motor 29 is stopped. At this time, the movable cutting member 21 is operated, whereby it is drawn towards the fixed cutting member 20. Motor 29 is associated with a reverse control, not shown in the drawing, and which can be at the end of either forward or reverse travel of the movable cutting member 21 in such a way that the end of the strip located in the access slot is withdrawn from the latter and placed outside the movement path of block of moulds 2. The reverse operation control of motor 29 can be designed in such a way that reverse operation of transporting rollers 23 is automatically stopped as soon as they hve moved back the end of strip 22 engaged in the slot to an area located outside the movement path of the mould, i.e. block of moulds 2 (cf FIG. 2). Motor 29 can for example be an electrical rotary motor. However, it can also comprise a control jack whose movable rod has a rack acting on a toothed control wheel which, via a clutch, for example an electromagnet clutch, is connected to the drive shaft of one of the transporting rollers 23. In this case, the clutch comprises a portion which is integral in rotation with the toothed control wheel and a second portion integral in rotation with one of the transporting rollers and is disengaged after a first portion of the reverse travel of fhe control jack in such a way that the transporting rollers 23 are no longer driven in reverse as soon as the free end of strip 22 has been removed from slot 19 and moved back into an area located outside the displacement path of mould 3. In this case, the length of the forward travel measured on the periphery of the transporting rollers 23 and more specifically the length of the strip transported by rollers 23 during a strip advance cycle is still larger than the length of a corresponding band 18 and is equal to the sum of the length of said band 18 and of the distance existing between the cutting edge of band 18 level with the pre-winding cavity 11 and the end of strip 22 in the withdrawn position, located outside the displacement path of mould 3.

When a rotary electric motor is used as the drive motor for transporting rollers 23, it is advantageous to provide in the first control of said motor 29 a reverse travel limit switch, operated by a member whose position is dependent on the location of a strip portion upstream of the corresponding transporting rollers 23. In order to prevent that portion of the strip located upstream of transporting rollers 23 from being loosened during the partial backward movement of said strip following the cutting of a band 18, it is advantageous to provide upstream and preferably in the immediate vicinity of the pair of transporting rollers 23, a tightening roller 30 which is, for example, mounted on a pivoting arm 31 pulled by a spring 32 in such a way that said tightening roller 20 is moved away from the transporting rollers 23 in order to increase the length of travel of strip 22 between said transporting rollers 23 and another reversal point of said strip or of the storage reel of said strip 22. In this case, the stop switch for the reverse of electric motor 29 can comprise a switch 33 operated by arm 31, whose pivot axis is parallel to that of transporting rollers 23 (cf FIG. 2). It is also possible to use switch 33, which can be operated by pivot arm 31 for controlling the disengagement of the clutch, which is for example an electromagnet clutch, mounted in the kinematic link between the driving means and the driven transporting roller 23.

In its inoperative position as shown in FIG. 2, the movable cutting member 21 is pulled for example by means of a restoring spring 34 located in a recess made in body 10 carrying the pre-winding cavities 11. The movable cutting member 21 is connected to actuating means which more particularly comprise a control member 35 which is, for example, constituted by a lug, whose head is located in a vertical groove 36a and 36b extending parallel to the axis of the pre-winding cavities 11 and of moulds 3 and made on the one hand in the front face of the movable cutting member 21 and on the other in the front face of the block of moulds 2, whereby the two groove portions 36a and 36b are vertically aligned when the movable cutting member 21 occupies its inoperative position as shown in FIG. 2 and in which the pre-winding cavity 11 is accessible through access slot 19. In this position of the movable cutting member 21, the block of moulds 2 can move vertically relative to the lug, that is to say relative to control member 35 which is stationary in vertical displacement. The control member 35 is preferably operated by a jack 37 mounted for example on the supporting bar 26 of transporting rollers 23. The rod of said control jack 37 can be connected either directly or via a two-armed lever 38 to control member 35. The two-armed lever 38 is articulated at 39 to a supporting base 40 which is also mounted on supporting bar 26 of transporting roller 23. The control member of the actuating means of the movable cutting member 21 can also comprise a hook 35' which is, for example, mounted in a vertical plane perpendicular to the lateral face of the movable cutting member 21 and in close proximity to said lateral face of member 21. Hook 35' serves to cooperate with an eyelet 41 having an opening with a vertical axis accessible from the top and which serves to receive hook 35', integral with the movable rod of a control jack 37' (cf FIG. 2). The eyelet is fixed to the lateral face of the movable cutting member 21 at preferably an intermediate level between the two upper and lower end faces of said movable cutting member 21. Eyelet 31 and hook 35' are positioned relative to one another in such a way that hook 35' is engaged in the opening of eyelet 41 when the block of moulds 2 occupies its upper position, a shown in FIGS. 1 and 3. During the lowering of block of moulds 2 towards its lower position, as shown in FIG. 4, the connection between hook 35', which is stationary in vertical displacement and eyelet 41 is interrupted, but is re-established as soon as the block of moulds 2 re-assumes its upper position. In the upper position control jack 37' can act on the movable cutting member 21 to bring about the cutting of bands 18 already engaged in pre-winding cavities 11.

It is also pointed out that the intermediate support member 16 can also be designed in accordance with the device described in French Patent application No. 76.02662 of Jan. 30th 1976.

The invention is not limited to the embodiments described and represented hereinbefore and various modifications can be made thereto without passing beyond the scope of the invention.

I claim:

1. An apparatus for the production and deposition of bands associated with shaping moulds of a shaping station of an installation for the thermal shaping of containers provided with bands, whereby said apparatus comprises an elongated body at least one preferably cylindrical, so-called winding cavity, at least one fixed cutting member and one movable cutting member located in the immediate vicinity of said cavity, at least one access slot issuing into the said cavity and which connects the latter lateraly with the outside, at least one ejecting plunger mounted without any significant lateral clearance in the said cavity in such a way that it can occupy two end positions in the latter, actuating means for the movable cutting member, at least one pair of transporting rollers located upstream of the access slot, a strip whose width is at the most equal to the height of the slot whose free end is gripped between the said transporting rollers and from whcih the bands are cut, as well as driving means able to sequentially drive the two transporting rollers for the purpose of introducing into the said cavity a strip portion whose length is equal to that of one band, wherein each pre-winding cavity is located below a mould and the body containing the various cavities is integral with the block of moulds, each ejecting plunger is fixed in space on a frame, each mould comprises base plate aligned with the corresponding cavity integral with the ejecting plunger by means of an intermediate supporting member and whose cross-section is smaller than that of the shaping chamber of the mould in such a way that there is a marginal base portion between the side walls and the movable base plate of the mould, whereby the base plate, intermediate supporting member and ejecting plunger are arranged relative to one another and relative to the shaping chamber and the pre-winding cavity in such a way that the upper face of the movable base plate is located in the same plane as the marginal base portion and the intermediate member is located entirely within the said cavity when the ejecting plunger is located at the lower end of said cavity, the intermediate supporting member has a cross-section which is smaller than that of the ejecting plunger, each pair of transporting rollers is mounted so as to be fixed in space and extends parallel to the supporting member substantially over the entire height of the latter starting from the ejecting plunger, the actuating means for the movable cutting member comprise a control member which is independent of the movements of said movable cutting member and which are parallel to the axes of the mould and the cavity, and the driving means for each pair of transporting rollers comprises a reverse movement control which can be operated at the end of the cutting stroke of the movable cutting member and automatically stops the reverse movement of the transporting rollers as soon as the latter have moved back the end of the strip engaged in the slot to an area located outside the displacement path of the mould or moulds.

2. An apparatus for the production and deposition of bands according to claim 1, wherein the intermediate supporting member has a cylindrical and preferably smooth periphery, whose cross-section has a surface area which is at least equal to half the surface area of the cross-section of the cavity and defines with the inner wall of said cavity an annular guidance chamber for the band introduced into the cavity.

3. An apparatus for the production and deposition of bands according to claim 1, wherein the control member of the actuating means for the movable cutting member comprises a lug and the movable cutting member and the wall of the mould positioned above the said movable cutting member have two grove portions aligned parallel to the displacement position of the mould when said movable cuting member is in a stationary position and in one of which is permanently engaged in a sliding manner the said control lug.

4. An apparatus for the production and deposition of bands according to claim 1, wherein the control member is connected to a control jack, preferably via a two-armed lever.

5. An apparatus for the production and deposition of bands according to claim 1, wherein the control member comprises a hook integral with a control jack and able to engage in a recess such as an eyelet provided on the movable cutting member when the mould occupies its raised shaping position.

6. An apparatus for the production and deposition of bands according to claim 1, wherein upstream and preferably in the immediate vicinity of the pair of transporting rollers it has a tightening roller for the strip gripped between the two said rollers, whereby said tightening roller is mounted on a pivoting arm drawn by a spring in such a way that said tightening roller is moved away from the transporting rollers.

7. An apparatus for the production and deposition of bands according to claim 1, wherein the reverse movement control of the driving means for the transporting rollers is associated with a stop switch for the reverse movement of the transporting rollers, said switch being preferably actuated by the pivoting arm.

8. An apparatus for the production and deposition of bands according to claim 1, wherein the driving means comprises a rotary electric motor whose reverse movement stopping is controlled by the stop switch.

9. An apparatus for the production and deposition of bands according to claim 1, wherein a preferably electromagnetic clutch is provided between the driving means and at least one of the transporting rollers, whereby the stop switch is able to control the disengagement of said clutch.

10. An apparatus for the production and deposition of bands according to claim 1, wherein the driving means comprises a rack actuated by a jack and cooperating with a toothed control wheel integral with part of the clutch, whose other part is integral in rotation with one of the transporting rollers.

11. An apparatus for the production and deposition of bands according to claim 1, wherein the length of the forward stroke of the transporting roller measured on the periphery of said rollers is greater than the length of a cut band.

* * * * *